March 30, 1954
L. BLANK ET AL
2,673,643
PRESSURE SENSITIVE TAPE
Filed Feb. 25, 1949
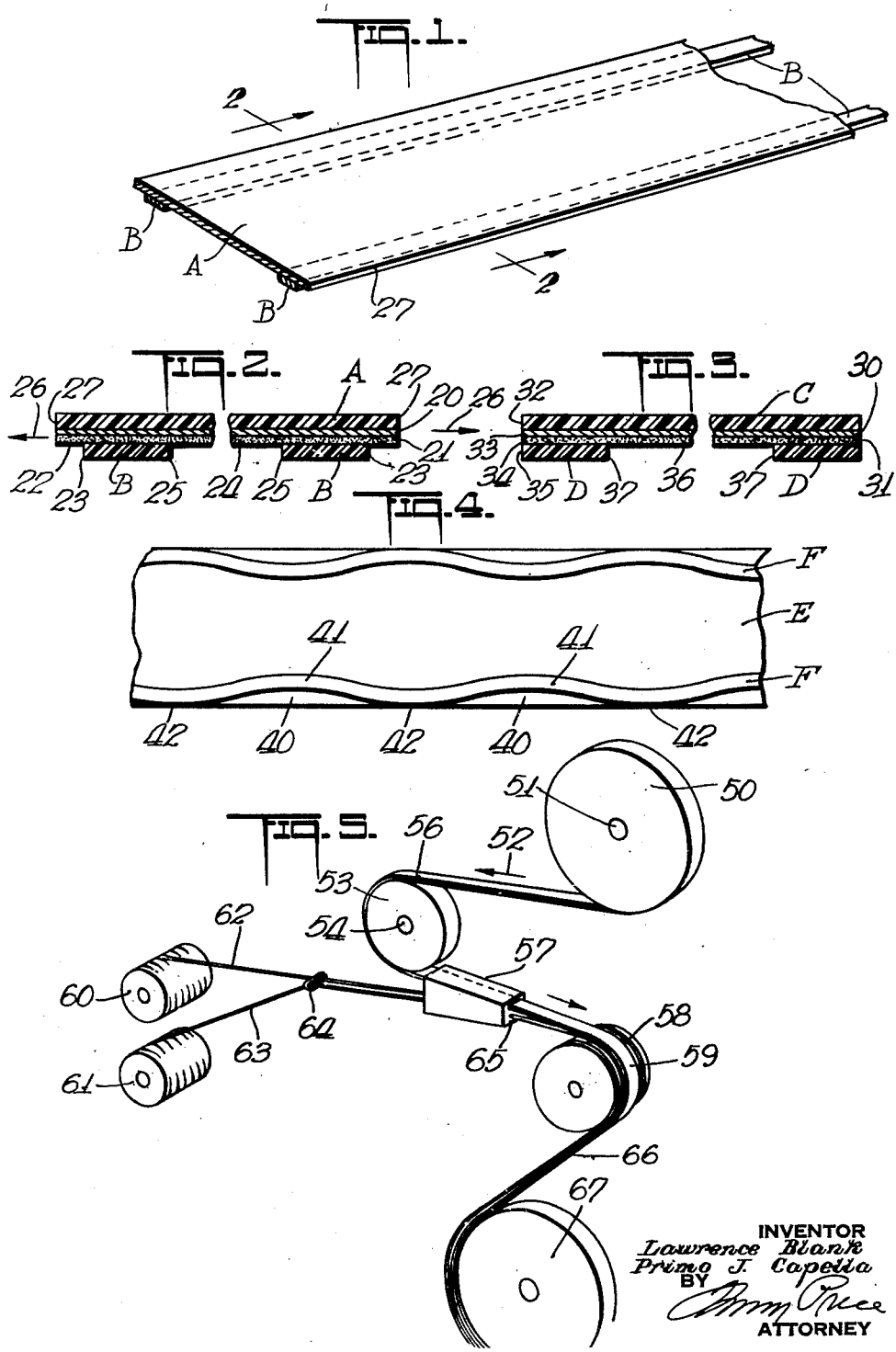
INVENTOR
Lawrence Blank
Primo J. Capella
BY
ATTORNEY

UNITED STATES PATENT OFFICE 2,673,643

PRESSURE SENSITIVE TAPE

Lawrence Blank and Primo J. Capella,
New York, N. Y.

Application February 25, 1949, Serial No. 78,322

1 Claim. (Cl. 206—59)

The present invention relates to pressure sensitive tapes having a transparent base upon which is applied a pressure sensitive adhesive.

Although not limited thereto, the present invention will be particularly described in its application to strips of regenerated sheet cellulose or cellophane or transparent strips of cellulose acetate, ethyl cellulose, vinyl resin, acrylic resins to one side of which has been applied a pressure sensitive adhesive.

Normally, these tapes are commercialized in rolls or cylinders in which the adhesive is applied to one face of the tape and is prevented from off-setting on the other side of the tape. For example this may be accomplished by a primer coat which holds the adhesive on one face of the tape or by applying to the contacting face of the tape which is not coated by adhesive an adhesive repellent surfacing coating or impregnation.

The adhesives usually are combinations of rubber-like materials or polymers or synthetic resins which will retain their tackiness over long periods of time and even when aged will not tend to offset, crack or flack from the face of the transparent tape or sheet material to which they are applied.

In connection with these transparent pressure sensitive tapes, and particularly in connection with the rubber-like adhesive compositions applied thereto, it has been found that the adhesive tends to flow, and, particularly with large rolls, tends to be squeezed to the sides of the transparent sheet material or transparent sheet tapes.

Not only does this result in a decrease in the amount of available adhesive on the contacting face of the tape but it also results in a large amount of adhesive spreading to the edges of the roll and covering the edges of the tape. Such adhesive on the edges of the tape tends to age more rapidly and disintegrate. Moreover, it forms a firmer bond with the edges of the tape, which causes ripping and breaking of the base strip material and frequently prevents the transparent material from being drawn in continuous lengths from a roll without frequent breakage after relatively short exposures to air and atmospheric conditions.

The formation of relatively large quantities of the adhesive adhering to the edges of the tape will also make it difficult uniformly to unwrap or wrap the flat strip and will tend to cause twisting or will result in removal of the tape in jerks from the roll carrying it when an even force is applied.

It is therefore among the objects of the present invention to provide a novel pressure sensitive tape of the character described, in which the adhesive will be maintained substantially on the medial portion of the contacting portion of the tape without being squeezed or caused to flow toward the edges of the tape and which tape will also be capable of uniform removal from a roll without twisting or breakage even though it be permitted to stand in the air and be subjected to aging over considerable periods of time.

A further object is to provide a novel pressure sensitive tape of the character described which will be particularly durable as a wrapping or packaging material and which may also be readily removed from the package without difficulty and will retain its desirable pressure sensitive qualities.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a pressure sensitive tape in which the adhesive or coating applied thereto is provided with elongated, longitudinal dams or elements to retard or restrain the flow of the adhesive, even under substantial pressure, toward or around the edges of the tape. These dams or elements may consist of narrow transparent sheet strips to cover and to be applied to the edges of the application face of the tape carrying the adhesive or they may consist of metallic ribbons or strips. Desirably, these strips may be almost at the edge so as to cover the adhesive directly at the edge of the pressure sensitive tape, or they may be placed slightly inside the edges so as to leave a slight expanse of adhesive facing outside of the longitudinal dams.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, modifications and variations can be resorted to which fall within the scope of the claim hereunto appended.

In the drawings wherein like reference characters denote corresponding parts throughout the several views:

Fig. 1 is a top perspective view with the base tape partly broken away to show the construction.

Fig. 2 is a transverse vertical sectional view upon the line 2—2 of Fig. 1 upon a slightly enlarged scale as compared to Fig. 1.

Fig. 3 is a transverse sectional view similar to Fig. 2 of an alternative construction upon a slightly enlarged scale as compared to Fig. 1.

Fig. 4 is a bottom plan view of still another alternative construction upon a slightly smaller scale than Figs. 1 to 3.

Fig. 5 is a diagrammatic side perspective view showing a machine and procedure for making the tape of Figs. 1, 2 and 3 showing the tape upon a small scale as compared to Figs. 1 to 4.

Referring to Fig. 1, there is shown a base tape A with the reinforcing dam strips B.

The base tape A may be of any suitable width, say ⅛″, ¼″, ½″, ¾″, 1″ or more, and it preferably consists of a thin sheet of cellulose acetate or regenerated cellulose or cellophane, but it may also be made of other transparent plastic sheets, such as cellulose butyrate, ethyl cellulose, vinyl resins or acrylic resins. It may also be made, if desirable, of paper, woven fabric, non-woven fabric or other sheet materials.

The strips B preferably may consist of thin strips of metal which desirably may be faced by thin plies of plastic or cellulosic materials. They may also be of the same material as the base A but they should be substantially thinner.

As shown in Figs. 1 and 2, there are two strips B for each strip A but if desired a multiplicity of strips B may be employed at spaced intervals transversely across the contacting face of the tape A.

Referring to Fig. 2, the base A may carry a primer coat 20 for attaching the adhesive coating 21 to the inside face or contacting face of the tape A. Desirably, the two damming strips leave a narrow edge of space 22 of the adhesive layer 21 so that there will be substantial adhesive beyond the outside edge 23 of the strips B while the bulk of the adhesive at 24 will be retained between the inside edges 25 of the strips B.

These strips B will act as dams and prevent the flow outwardly of the adhesive, as indicated by the arrows 26, and will also prevent an accumulation of adhesive over the cut edges 27 of the base A.

In Fig. 3 the base tape C is provided with a primer coat 30, a pressure sensitive adhesive facing 31 and the two damming strips D. It will be noted that the edges 32 of the base tape, the edges 33 of the primer coating 30, and the edges 34 of the adhesive facing 31 and 35 of the strips D are all flush at the outside edges. All of the adhesive 36 is restrained between the inside edges 37 of the damming strips D.

In the embodiment of Fig. 4, the base strip E is provided with the wavy or sinuous damming strips F which, as indicated, leave spaces of adhesive at 40 where they are drawn inwardly at 41, and contact the edge at 42 so that a combination of the structure of Fig. 2 and the structure of Fig. 3 is obtained in one tape.

It has been found that Fig. 4 not only gives an exceedingly strong reinforced pressure sensitive tape but also assures that the edges of the tape will be tacked down by the adhesive at 40 at spaced intervals, giving a particularly satisfactory yet very strong construction.

In the diagrammatic machine and procedure illustrated in Fig. 5, the roll of tape 50 is carried on a spindle 51 and feeds, as indicated by the arrow 52, onto the roller 53 on the axis 54. The pressure sensitive side 56 of the tape 50 is exposed outwardly on the roller 53. The guide 57 will feed the tape onto the grooved roller 58, where the pressure sensitive face 56 will be turned inwardly, the exposed face 59 being smooth and devoid of adhesive.

The rolls 60 and 61 carry the damming strips 62 and 63, which pass through the eyelets 64 and are fed through guide recesses 65 onto the roll 58 simultaneously with the adhesive strip 50. The assembled strip 66 is then fed onto the roll 67, where it may be then wrapped and shipped out for utilization.

Not only will the damming strips B, D and F prevent lateral flow of the adhesive 24 and 36, even though substantial pressure be applied to the rolls, but they also will greatly reinforce the edges of the tapes A, C and E where they are weakest. By using different colors of strips B, D and F, they give a most artistic, decorative effect to the tapes. At the same time there is less crinkling or twisting of the tape when removed from the roll, and it is more readily possible to apply the tapes flat without unevenness upon a paper surface.

A further advantage resides in the fact that if the reinforcing or damming strips B, D and E are made of metal, they can also be used to tear the length of the tape and enable more ready removal of the tape from packages, letters or other devices to which it has been attached for adhesive purposes.

While there has been herein described a preferred form of the invention, it should be understood that the same may be altered in details and in relative arrangement of parts within the scope of the appended claim.

Having now particularly described and ascertained the nature of the invention, and in what manner the same is to be performed, what is claimed is:

A pressure sensitive regenerated cellulose tape for stationery uses comprising a strip of cellophane, a pressure sensitive flowable rubbery adhesive coating on one side thereof and two relatively narrow supplemental strips superimposed on said coating closely adjacent to the edges of the main strip to prevent flow of the pressure sensitive adhesive toward the edges of the main strip, said adhesive coating completely covering one side only of the cellophane strip and said tape being in the form of a roll with contacting convolutions.

LAWRENCE BLANK.
PRIMO J. CAPELLA.

References Cited in the file of this patent

UNITED STATES PATENTS

| Number | Name | Date |
| --- | --- | --- |
| 1,236,462 | McKay | Aug. 14, 1917 |
| 2,049,030 | Strauss | July 28, 1936 |
| 2,125,838 | Stark | Aug. 2, 1938 |
| 2,295,613 | Stillwell | Sept. 15, 1942 |
| 2,354,702 | Protz | Aug. 1, 1944 |